United States Patent [19]

Higgins, Jr. et al.

[11] 3,904,615
[45] Sept. 9, 1975

[54] PROCESS FOR CLEAVING CEPHALOSPORIN COMPOUNDS

[75] Inventors: Harvey M. Higgins, Jr., Danville; Jon W. Fitzsimmons, Indianapolis, both of Ind.

[73] Assignee: Eli Lilly and Company, Indianapolis, Ind.

[22] Filed: May 1, 1972

[21] Appl. No.: 249,293

[52] U.S. Cl............................. 260/243 C; 424/246
[51] Int. Cl.².................................... C07D 501/18
[58] Field of Search................................ 260/243 C

[56] References Cited
UNITED STATES PATENTS

| 3,499,909 | 3/1970 | Weissenburger et al........ 260/243 C |
| 3,575,970 | 4/1971 | Weissenburger et al........ 260/243 C |

Primary Examiner—Nicholas S. Rizzo
Attorney, Agent, or Firm—William B. Scanlon; Everet F. Smith

[57] ABSTRACT

In cleaving the carboxamide group in the 7-position of a cephalosporin by blocking the carboxyl groups with mixed anhydrides, formation of an imino halide, conversion of the imino halide to an imino-ether in a tetrahydrofuran, bis(2-methoxyethyl)ether, 2-methoxyethyl acetate, ethylene glycol diacetate, 1,4-dioxane, or 1,3-dioxane, and hydrolysis of the imino ether to a free amino group, an improvement results when a catalytic amount of quinoline, isoquinoline, 3-picoline, 4-picoline, pyridine or an acid addition salt or complex thereof is added to the tetrahydrofuran, bis(methoxyethyl)ether, methoxyethyl acetate, ethylene glycol diacetate, 1,4-dioxane or 1,3-dioxane mixture prior to the imino halide reaction.

5 Claims, No Drawings

PROCESS FOR CLEAVING CEPHALOSPORIN COMPOUNDS

INTRODUCTION

This invention relates to processes for cleaving cephalosporin compounds to form the cephalosporin nuclei which are useful intermediates in making more potent and different cephalosporin antibiotic substances.

BACKGROUND OF THE INVENTION

The cephalosporins are a well-known family of antibiotics some of which are widely used in the treatment of disease.

Cephalosporin C, obtained by fermentation, has been defined as having the following structure:

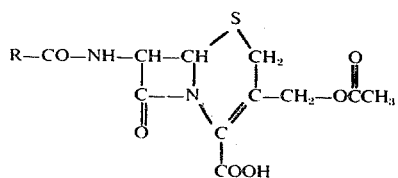

where R is $HOOC-CH(NH_2)-(CH_2)_3-$. It is also known as 7-(5'-aminoadipamido)-cephalosporanic acid. It has weak antibiotic activity, but it is important as a source of cephalosporin C nucleus, that is, 7-aminocephalosporanic acid (7-ACA), having the structural formula

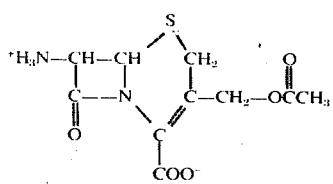

shown here in zwitterionic form, although anionic and cationic salts may be formed and used. Medically important antibiotics such as cephalothin and cephaloridine and cephaloglycin are prepared from 7-ACA by known methods. Various derivatives of 7-ACA based antibiotics are made by acylating the 7-amino group of 7-ACA with appropriate acyl acids, halides, or other reactive forms of such acyl groups and/or by replacing the acetoxy group attached to the 3-methyl carbon atom with appropriate nucleophilic groups now well documented in the literature. Thus it can be seen that cephalosporin C is a very valuable fermentation derived antibiotic which is of special interest as a source of starting material for producing numerous other more potent antibiotics. Desacetoxycephalosporin C, described in U.S. Pat. No. 3,124,576 is also of interest as an intermediate for preparing 7-aminodesacetoxycephalosporin C (7-ADCA) by similar cleavage procedures. Desacetoxycephalosporin C and alkali metal salts thereof can also be used as starting materials in the improved process of this invention.

One method of cleaving an amido group to obtain the free amine is that described by Lander, J. Chem. Soc., 83, 320 (1903). In accordance with Lander's method the amide is treated with a halogenating agent to convert the amido group into an amino halide followed by treating the amino halide with an alcohol to obtain the amino ether which is then hydrolyzed to the free amine. The application of this method to the cleavage of cephalosporin C to 7-ACA is disclosed in Canadian Pat. No. 770,125 British Pat. No. 1,041,985.

In order to successfully apply this sequence of reactions to cephalosporins, it is necessary first to protect the carboxyl group in the molecule. It is particularly important to protect the carboxyl group in the 4-position of the cephalosporin. Heretofore, these carboxyl groups generally have been protected by converting them to esters. With the exception of silyl esters, these esters are generally stable to the reaction conditions and the ester product must be subjected to further treatment in order to obtain the free acid. Such treatment involves more rigorous acid or base hydrolysis or, in some instances, hydrogenolysis. These added steps result in added processing costs, and in the case of more rigorous acid hydrolysis there is some hydrolysis of the acetoxy group at the $C_3$ methylene of cephalosporin C-type compounds to desacetylcephalosporins; in the case of base hydrolysis there is the danger of an isomerization of double bond in the dihydrothiazine ring of cephalosporin C-type compounds. Further, numerous procedures for the preparation of carbon esters, lead to isomerization of the double bond in the cephalosporin solvate. A $\Delta^2$ product (isocephalosporin) is obtained. Silyl esters are more sensitive to traces of moisture and therefore less stable than carbon esters during their reaction. In fact, in some instances, they are too easily removed. Further, the reagents used in the preparation of silyl esters are expensive and not always readily available in commercial quantities. In U.S. application Ser. No. 117,043, filed Feb. 19, 1971, now U.S. Pat. No. 3,839,328 issued Oct. 1, 1974 Robert R. Chauvette describes an improved process for protecting the carboxyl groups of cephalosporins during the cleavage reaction comprising blocking the carboxyl groups by converting them to a mixed anhydride derived from the acid having the formula $$R'''-CO_2H$$

wherein

R''' is $C_1$ to $C_8$ alkyl, alkenyl, or alkynyl; halo-$C_1$ to $C_8$ alkyl, alkenyl, or alkynyl; phenyl

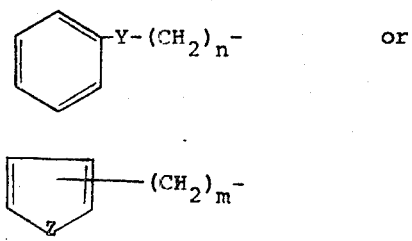

Y is oxygen, sulfur, or a carbon to carbon bond; n is an integer of 0 to 3 and is at least 1 when Y is oxygen or sulfur; Z is oxygen, sulfur or N—H; and $m$ is an integer of 1 to 3.

In U.S. Pat. No. 3,641,018, patented Feb. 8, 1972, Harold B. Hayes and Gerald L. Huff disclosed an improved process for the preparation of 7-aminocephalosporanic acid from cephalosporin C by protecting the carboxyl groups, treating with a halogenating agent to convert the amido group in the 7-position to an imino halide, converting the imino halide to imino ether, and hydrolyzing the imino ether to 7-aminocephalosporanic acid with the improvement which comprises acylating the amino group and the adipamoyl side chain with an α-halo or α,α-dihalo C$_2$–C$_4$ alkanoyl group prior to the step of protecting the carboxyl groups. It has been the practice in these cleavage reaction manufacturing processes to use a water immiscible organic solvent, for example, chloroform, methylene chloride, or the like to conduct the carboxyl blocking reaction, the imino halide forming reaction, the imino forming reaction on the cephalosporin C or derivative thereof. These reactions are followed by the aqueous treatment of the resulting reaction mixture to cleave the side chain and by base treatment of the organic solvent/water reaction mixture to precipitate and separate the 7-aminocephalosporanic acid or other nucleus from the reaction mixture. In those operations, emulsion problems have been experienced. These emulsions are sometimes difficult to break in a reasonable time. To avoid these emulsion problems, persons in the art have filtered the reaction mixture after the mixed anhydride carboxyl blocking step. This filtration step seems to remove the emulsion forming substances or at least keeps the emulsion from being too severe a problem. In some cases, because of the scale of the operation, it is not desired to filter the reaction mixture at least until after the aqueous treatment step. The emulsion that carries through several reactions can be filtered after the aqueous treatment step. allowing the strongly acidic reaction mixture to stand for 5 minutes or so appears to break the emulsion. On a laboratory scale, corrosion resistant equipment such as glass centrifuge tubes is available. On a large scale, equipment such as a ceramic lined centrifuge is difficult to obtain and is expensive. These emulsion problems cause yield losses, they increase cycle time in the plant and they can require the use of extra operations or special equipment. In addition, the use of chloroform solutions in plant scale operations of this process causes discomfort to plant personnel during warm weather.

In efforts to avoid problems, such as the above mentioned emulsion problems, which occur especially when processing fermentation derived cephalosporin C or its derivatives, various water-miscible organic solvent for the cleavage reaction mixture have been tried. Acetonitrile is a good solvent for cleavage of cephalosporin C or its derivatives. However, acetonitrile is such a good solvent for 7-aminocephalosporanic acid that its use requires its removal, for example, by distillation, from the final reaction mixture to separate the 7-aminocephalosporanic acid therefrom. There is a need in the cephalosporin cleavage art for a process improvement which will help simplify the cleavage operation, avoid emulsion problems, reduce discomfort to personnel, reduce the need for special equipment and save time in manufacturing operations.

In a companion application, Ser. No. 249,294 filed May 1, 1972, now U.S. Pat. No. 3,840,532 issued Oct. 8, 1974 Harold B. Hayes et al disclose a process improvement wherein they provide the cephalosporin cleavage art with tetrahydrofuran, bis(2-methoxyethyl)ether, 2-methoxyethyl acetate, ethylene glycol diacetate, 1,4-dioxane or 1,3-dioxane as a solvent medium for the reactions which will permit the direct low temperature reactions, while permitting the use of a "one-pot" operation of the cleavage reaction, thus simplifying the process.

It is an object of this invention to provide the cephalosporin cleavage art with a process improvement which will further increase the average yields of 7-aminocephalosporanic acid and 7-aminodesacetoxycephalosporanic acid from alkali metal cephalosporin C, sodium desacetoxycephalosporin C or other related cephalosporin starting material in a tetrahydrofuran, bis(2-methoxyethyl) ether, 2-methoxyethyl acetate, ethylene glycol diacetate, 1,4-dioxane or 1,3-dioxane solvent medium.

SUMMARY OF THE INVENTION

Briefly, we have discovered that the commingling of catalytic amounts of quinoline, isoquinoline, 3-picoline, 4-picoline, pyridine or an acid salt thereof or complex thereof with a C$_2$ to C$_3$ alkanoyl halide with a tetrahydrofuran, bis(2-methoxyethyl) ether, 2-methoxyethyl acetate, ethylene glycol diacetate, 1,4-dioxane, or 1,3-dioxane mixture containing an alkali metal cephalosporin C or desacetoxycephalosporin C, or other cephalosporin prior to the addition of the imino halide forming reagent increases substantially the average yields of 7-aminocephalosporanic acid, or 7-amino-desacetoxycephalosporanic acid obtained after the series of reactions including mixed anhydride formation, imino halide formation, imino-ether formation, and hydrolysis, as compared with the yields which are obtained when such a base is not commingled into the mixture.

DETAILED DESCRIPTION OF THE INVENTION

This invention provides an improvement to processes for cleaving the 7-carboxamido group from a cephalosporin. The process improvement of this invention is particularly contemplated for use in processes for making 7-aminocephalosporanic acid (7-ACA) from an alkali metal salt of cephalosporin C in tetrahydrofuran, bis(2-methoxyethyl) ether, 2-methoxyethyl acetate, ethylene glycol diacetate, 1,4-dioxane or 1,3-dioxane diluent systems. It can also be used for making 7-aminodesacetoxycephalosporanic acid (7-ADCA) from desacetoxycephalosporin C (U.S. Pat. No. 3,124,576) or other cephalosporin nucleus, such as 3-methoxymethyl-7-amino-3-cephem-4-carboxylic acid from 7-(5'-aminoadipoylamido)-3-methoxymethyl-3-cephem-4-carboxylic acid. This invention comprises commingling catalytic amounts of quinoline, isoquinoline, 3-picoline, 4-picoline, pyridine or an acid addition salt of one or more of such bases, or a complex thereof with a C$_2$ to C$_3$-alkanoyl halide with the tetrahydrofuran, bis(2-methoxyethyl) ether, 2-methoxyethyl acetate, ethylene glycol diacetate, 1,4-dioxane or 1,3-dioxane mixture containing the alkali metal cephalosporin C, desacetoxycephalosporin C, or other cephalosporin C derivative prior to the addition of the halogenating reagent, e.g., phosphorus pentachloride, to the mixture. In a procoess for cleaving the 7-(5'-aminodipoyl) side chain from cephalosporin C alkali metal salt in tetrahydrofuran by the above mixed anhydride, imino halide, imino ether and hydrolysis series of reactions, quinoline is the preferred base for this catalytic purpose.

The quinoline, isoquinoline 3-picoline, 4-picoline, pyridine, acid addition salt or complex catalyst can be added to the reaction mixture any time prior to the addition of the halogenating agent, i.e., the imino halide forming agent, e.g., phosphorus pentachloride. For example, it can be mixed in any order of addition with the alkali metal cephalosporin C, tetrahydrofuran, N,N-diethylaniline, $C_2$ to $C_4$-alkanoyl halide, e.g. acetyl chloride, prior to phosphorus pentachloride addition. We prefer to stir or otherwise agitate the mixture for about 15 minutes to insure an efficient blocking reaction before the halogenating agent is added to the mixture.

Examples of acid addition salts of such catalytic bases include those with any of the readily available, non-oxidizing economic acids such as hydrochloric, sulfuric, sulfonic and phosphoric acids, and the like. Complexes of such bases with any $C_2$ to $C_3$-alkanoyl halide or halogenated alkanoyl halide preferably a chloride or bromide such with acetyl chloride, acetyl bromide, propionyl chloride or bromide, chloroacetyl chloride, can also be used.

We have discovered that these bases enhance the acylation reactions in the first step; they assist dissolution of alkali metal cephalosporin C or related compound in the solvent mixture and speed up the reaction time for the series of reactions necessary to form 7-aminocephalosporanic acid from alkali metal cephalosporin C. The principles of this invention can also be applied to processes for cleaving side chains from cephalosporins generally, but its largest immediate economic application is in the cleavage of alkali metal, e.g., sodium or potassium, salts of cephalosporin C in a tetrahydrofuran solvent system using the mixed anhydride:imino halide:imino-ether:hydrolysis series of reactions process which is now well known in the patent literature.

Any amount of quinoline, 3-picoline, 4-picoline or pyridine or salt or complex thereof which will enhance the speed and/or yield of the process may be used in practicing this process improvement. We prefer to use one of these catalytic bases in a ratio of between about 3 to 10 millimoles of base per 20 millimoles of alkali metal cephalosporin C in tetrahydrofuran, or other solvent. More preferably, we have found that from 8 to 9 millimoles of base, e.g., quinoline, per 20 millimoles of alkali metal cephalosporin C, e.g., sodium cephalosporin C, in tetrahydrofuran is about optimum in this process.

The 7-acylamidocephalosporin compounds which are used as starting materials for the improved process of this invention can be described as having the formula

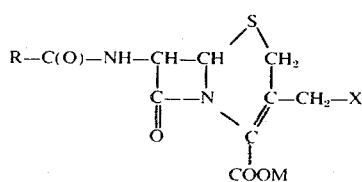

wherein
R-C(O) is the carboxylic acyl group to be cleaved,
X is $C_2$ to $C_8$-alkanoyloxy, hydrogen, or -Y-($C_1$ to $C_{10}$-alkyl) where X is oxygen or sulfur; and
M is hydrogen or an alkali metal cation The preferred starting material for this improved process is sodium cephalosporin C, although potassium or lithium cephalosporin C can also be used. When R-C-(O)- is 5-aminoadipoyl, X is hydrogen, and M is an alkali metal such as sodium the starting material is sodium desacetoxycephalosporin C. Starting compounds wherein X is —Y—($C_1$ to $C_{10}$-alkyl) such as methoxy, ethoxy, propyloxy hexyloxy, decyloxy, and the alkylthio counterparts can be prepared by methods known, e.g., as described in U.S. Pat. Nos. 3,647,788 and 3,637,678.

In general, in practicing the improved process of this invention, the alkali metal salt of cephalosporin C, desacetoxycephalosporin C, or other cephalosporin C derivative, or their equivalent is suspended or dissolved in tetrahydrofuran, bis(2-methoxyethyl) ether, 2-methoxyethyl acetate, ethylene glycol diacetate, 1,4-dioxane or 1,3-dioxane or mixtures thereof having freezing points below the lowest desired reaction temperature in the cleavage reactions. The desired catalytic base, e.g., quinoline, together with a hydrogen halide absorbing base such as N,N-di($C_1$ to $C_3$-alkyl)aniline, and an acyl halide e.g. acetyl chloride are added to block the carboxyl and amine groups. After the blocking reaction is completed, additional base is added, if needed, and then halogenating agent such as phosphorus pentachloride is added after cooling the mixture to the desired reaction temperature. Temperatures on the order of $-25°$ to $-10°C$. are preferred for the imino halide formation reaction. The mixture is stirred in the cold until the reactions to form the imino halide is substantially completed and then the selected alcohol or polyol is added to the cooled reaction mixture to form the iminoether. When the alcoholysis reaction is completed, an aqueous liquid is added to effect hydrolysis of the side chain of the cephalosporin and to form the respective cephalosporin in the acid medium. The mixture is allowed to warm to a temperature above the freezing point of the aqueous medium. In our experience, the pH of the reaction medium after the water addition has generally been from 0 to 1. Thereafter the tetrahydrofuran/water or other organic solvent/water solution of the acidic reaction mixture is treated with base to raise the pH of the mixture to the pH at which the bulk of the product precipitates (the iso-electric point). We prefer to use concentrated ammonium hydroxide although any other economical base is suitable for this purpose.

The invention is further illustrated by the following detailed examples which are not intended to be limiting of the scope of the claimed process improvement.

EXAMPLE 1

A. Procedure for the cleavage of sodium cephalosporin C with quinoline added.

Into a 500 ml. round bottom flask equipped with a thermometer and drying tube were placed 9.8 g. of sodium cephalosporin C (20 mmol, 84.6% pure), 100 ml. of tetrahydrofuran (THF), 1.0 ml. (8.5 mmol) of quinoline and 15 ml. of diethylaniline. To the above mixture at 25°C. was added 20 ml. of acetyl chloride. The resulting mixture was stirred rapidly for 15 min. during which time the temperature slowly rose to 35°C. The temperature was maintained at or about 35°C. After the 15 min. reaction time, the mixture was cooled to $-15°C$. and 11 ml. of diethylaniline and 9.8 g. of phosphorous pentachloride were added. The reaction was then stirred for 1 hr. at $-20°C$. At the end of this hour, 25 ml. of ethylene glycol was added and the resulting mixture stirred for 1 hour at 0° to +5°C. To the above reaction was added 150 ml. of ice water and the resulting solution stirred in an ice bath for 10 min. The pH of this solution was then adjusted slowly to 3.5 with concentrated aqueous ammonia. The 7-aminocephalosporanic acid (7-ACA) suspension was stirred for 30 min. in an ice bath then filtered, washed with water and methanol, and then dried. The yield was 4.4 g. (93.1 percent pure, 75.2 percent yield).

The average yield for 4 identical runs using this procedure was 78.0 percent.

B. The procedure for the cleavage without quinoline is the same as above with the quinoline omitted. The yield was 2.4 g. (90.2 percent pure, 39.7 percent yield).

EXAMPLE 2

Procedure for the cleavage of sodium cephalosporin C with 3-picoline added.

Into a 500 ml. round bottom flask equipped with a thermometer and drying tube were placed 9.8 g. of sodium cephalosporin C (20 mmol, 84.6 percent pure), 100 ml. of tetrahydrofuran (THF), 0.41 ml. (4 mmol) of 3-picoline and 15 ml. of diethylaniline. The mixture was cooled to 15°C. and 20 ml. of acetyl chloride was added. The reaction was stirred rapidly for 15 min. during which time the temperature rose slowly to approximately 32°C. The mixture was then cooled to −15°C., and 11 ml. of diethylaniline and 9.8 g. of phosphorous pentachloride were added. The reaction was then stirred for 1 hour at −20°C. At the end of this hour, 25 ml. of ethylene glycol was added and the resulting mixture stirred for 1 hr. at 0° to 5°C. To the above reaction was added 150 ml. of ice water and the resulting solution stirred in an ice bath for 10 min. The pH of this solution was then adjusted slowly to 3.5 with concentrated aqueous ammonia. The 7-aminocephalosporanic acid (7-ACA) suspension was stirred for 30 min. in an ice bath then filtered, washed with water and methanol, and dried. The yield was 3.0 g., 95 percent purity, (52.5 percent yield).

EXAMPLE 3

Procedure for the cleavage of sodium cephalosporin C with pyridine added.

Into a 500 ml. round bottom blask equipped with a thermometer and drying tube were placed 9.8 g. of soidum cephalosporin C (20 mmol, 84.6 percent pure), 100 ml. of tetrahydrofuran (THF), 0.34 ml. (4 mmol) of pyridine and 15 ml. of diethylaniline. The mixture was cooled to 15°C. and 20 ml. of acetyl chloride was added. The reaction was stirred rapidly for 15 min. during which time the temperature rose slowly to approximately 32°C. The mixture was then cooled to −15°C. and 11 ml. of diethylaniline and 9.8 g. of phosphorous pentachloride were added. The reaction was then stirred for 1 hr. at −20°C. At the end of this hour, 25 ml. of ethylene glycol was added and the resulting mixture stirred for 1 hr. at 0° to 5°C. To the above reaction was added 150 ml. of ice water and the resulting solution stirred in an ice bath for 10 min. The pH of this solution was then adjusted slowly to 3.5 with concentrated aqueous ammonia. The 7-aminocephalosporanic acid (7-ACA) suspension was stirred for 30 min. in an ice bath then filtered, washed with water and methanol, and dried. The yield was 3.1 g., 90.6 percent purity (51.6 percent yield).

EXAMPLE 4

Procedure for the cleavage of sodium cephalosporin C with 4-picoline added.

Into a 500 ml. round bottom flask equipped with a thermometer and drying tube were placed 9.8 g. of sodium cephalosporin C (20 mmol, 84.6 percent pure), 100 ml. of tetrahydrofuran (THF), 0.41 ml. (4 mmol) of 4-picoline and 15 ml. of diethylaniline. The mixture was cooled to 15°C. and 20 ml. of acetyl chloride was added. The reaction was stirred rapidly for 15 min. during which time the temperature rose slowly to approximately 32°C. The mixture was then cooled to −15°C., and 11 ml. of diethylaniline and 9.8 g. of phosphorous pentachloride were added. The reaction was then stirred for 1 hr. at −20°C. At the end of this hour, 25 ml. of ethylene glycol was added and the resulting mixture stirred for 1 hr. at 0° to 5°C. To the above reaction was added 150 ml. of ice water and the resulting solution stirred in an ice bath for 10 min. The pH of this solution was then adjusted slowly to 3.5 with concentrated aqueous ammonia. The 7-aminocephalosporanic acid (7-ACA) suspension was stirred for 30 min. in an ice bath then filtered, washed with water and methanol, and dried. The yield was 3.4 g., 96.4 percent purity, (60.3 percent yield).

EXAMPLE 5

Procedure for the cleavage of sodium cephalosporin C with isoquinoline added.

Into a 500 ml. round bottom flask equipped with a thermometer and drying tube were placed 9.8 g. of soidum cephalosporin C (20 mmol, 84.6 percent pure), 100 ml. of tetrahydrofuran (THF), 1.0 ml. (8.5 mmol) of isoquinoline and 15 ml. of diethylaniline. Then 20 ml. of acetyl chloride was added and the reaction was stirred rapidly for 15 min. during which time the temperature rose to approximately 40°C. and was cooled slowly to 30°C. The mixture was then cooled to −15°C., and 11 ml. of diethylaniline and 9.8 g. of phosphorous pentachloride were added. The reaction was then stirred for 1 hr. at 20°C. At the end of this hour, 25 ml. of ethylene glycol was added and the resulting mixture stirred for 1 hr. at 0° to 5°C. To the above reaction was added 150 ml. of ice water and the resulting solution stirred in an ice bath for 10 min. The pH of this solution was then adjusted slowly to 3.5 with concentrated aqueous ammonia. The 7-ACA suspension was stirred for 30 min. in an ice bath, then filtered, washed with water and methanol, and dried. The yield of 7-aminocephalosporanic acid was 3.2 g. (93.1 percent pure, 54.6 percent yield).

EXAMPLE 6

To a mixture of 9.8 g. of sodium cephalosporin C in 100 ml. of tetrahydrofuran there was added 1.0 ml. of quinoline and 15.0 ml. of N,N-diethylaniline. To this mixture there was added 20.0 ml. of acetyl chloride. The temperature rose from 21°C. to 35°C. The mixture was cooled and 11.0 ml. of N,N-diethylaniline was added. At −16°C. 10 g. of phosphorus pentachloride was added. The temperature rose to −2°C. Then 25.0 ml. of methanol was added at −20°C. The temperature rose to +16°C. After stirring to insure complete reaction 150 ml. of water was added at −3°C. The temperature rose to +10°C. The pH of the resulting reaction mixture was 0.5. Ammonium hydroxide (conc., 20 ml.) was added to raise the pH of the mixture to the point at which 7-aminocephalosporanic acid precipitates. After filtering there was obtained 3.82 g. of 7-aminocephalosporanic acid having a ultraviolet purity of 94.4 percent of nicotinamide assay purity of 93.2 percent for a yield of 65.5 percent.

We claim:
1. In the process for N-deacylating a 7-acylaminocephalosporin compound of the formula

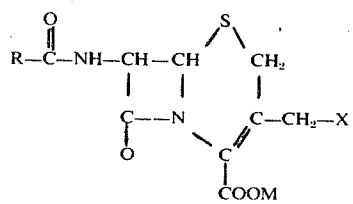

wherein

is an acyl group derived from a carboxylic acid;
X is hydrogen, $C_2$ to $C_8$-alkanoyloxy or $-Y-(C_1$ to $C_{10}$-alkyl) where Y is oxygen or sulfur; and
M is hydrogen or an alkali metal cation;
which comprises
1. reacting the cephalosporin compound in suspension or solution in tetrahydrofuran, bis(2-methoxyethyl)ether, 2-methoxyethyl acetate, ethylene glycol diacetate, 1,4-dioxane or 1,3-dioxane or water miscible liquid mixtures thereof with an acyl halide of a carboxylic acid

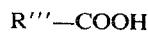

wherein R''' is $C_1$-$C_8$ alkyl, alkenyl, or alkynyl; halo-$C_1$-$C_8$ alkyl, alkenyl or alkynyl; phenyl

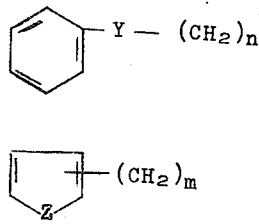

wherein
Y is oxygen, sulfur or a carbon to carbon bond;
n is an integer of 0 to 3 and is at least 1 when Y is oxygen or sulfur;
Z is oxygen, sulfur or N-H; and
m is an integer of 1 to 3;
to form the mixed anhydride with said cephalosporin compound and said acid;
2. reacting the cephalosporin mixed anhydride with a halogenating agent to form the cephalosporin imino halide;
3. reacting the imino halide with an alcohol to form the cephalosporin imino ether; and
4. hydrolyzing the imino ether to form a 7-aminocephalosporin nucleus of the formula

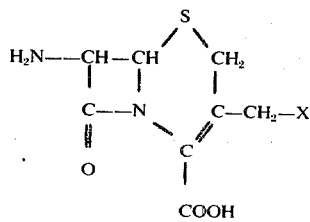

the improvement which comprises incorporating between 3 and 10 millimoles of quinoline, isoquinoline, 3-picoline, 4-picoline, pyridine or an acid addition salt of one or more of such bases per 20 millimoles of said 7-acylaminocephalosporin, into the suspension or solution of said 7-acylaminocephalosporin in tetrahydrofuran, bis(2-methoxyethyl) ether, 2-methoxyethyl acetate, ethylene glycol diacetate, 1,4-dioxane or 1,3-dioxane containing medium prior to the addition of the halogenating agent.

2. A process as defined in claim 1 wherein an alkali metal salt of cephalosporin C is incorporated into tetrahydrofuran, and treated by the described process to form 7-aminocephalosporanic acid.

3. A process as defined in claim 2 wherein quinoline or an acid addition salt thereof is used as the catalyst.

4. A process as defined in claim 1 wherein quinoline is added to a mixture of sodium cephalosporin C and tetrahydrofuran prior to or simultaneously with reacting the sodium cephalosporin C with a $C_2$ to $C_4$-acyl halide.

5. In a process for cleaving the 7-(5'-aminoadipoyl)side chain from sodium cephalosporin C to form 7-aminocephalosporanic acid by the steps of commingling sodium cephalosporin C with tetrahydrofuran and a hydrogen halide absorbing base, adding acetyl chloride to acylate the cephalosporin C carboxyl and amino groups, adding phosphorus pentachloride and a base to form the imino-chloride of the acylated cephalosporin C, adding methanol to form the imino-ether, and hydrolyzing the reaction product with water, the improvement which comprises incorporating between 3 and 10 millimoles of a member of the group consisting of quinoline, isoquinoline, 3-picoline, 4-picoline, pyridine or an acid addition salt thereof per 20 millimoles of sodium cephalosporin C into the reaction mixture prior to or simultaneously with addition of acetyl chloride to the sodium cephalosporin C/tetrahydrofuran mixture.

* * * * *